(12) United States Patent
Izumi (10) Patent No.: US 11,958,135 B2
(45) Date of Patent: Apr. 16, 2024

(54) MACHINING CONDITION ADJUSTMENT DEVICE AND MACHINE LEARNING DEVICE

(71) Applicant: FANUC Corporation, Yamanashi (JP)

(72) Inventor: Takashi Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1024 days.

(21) Appl. No.: 16/541,154

(22) Filed: Aug. 15, 2019

(65) Prior Publication Data

US 2020/0061753 A1 Feb. 27, 2020

(30) Foreign Application Priority Data

Aug. 24, 2018 (JP) .................................. 2018-157520

(51) Int. Cl.
*B23K 26/70* (2014.01)
*B23K 26/14* (2014.01)
*G06N 3/08* (2023.01)

(52) U.S. Cl.
CPC ............ *B23K 26/705* (2015.10); *B23K 26/14* (2013.01); *B23K 26/1436* (2015.10); *B23K 26/1462* (2015.10); *G06N 3/08* (2013.01)

(58) Field of Classification Search
CPC .............. B23K 26/705; B23K 26/1436; B23K 26/1462; G06N 3/08
See application file for complete search history.

(56) References Cited

U.S. PATENT DOCUMENTS

| 9,919,383 B2 * | 3/2018 | Kano .................. B23K 26/382 |
| 2003/0102294 A1 | 6/2003 | Kinbara et al. |
| 2005/0178749 A1 | 8/2005 | Yamazaki et al. |
| 2009/0134132 A1 * | 5/2009 | Verna ................. B23K 26/1437 219/121.64 |

(Continued)

FOREIGN PATENT DOCUMENTS

| CA | 2390873 A1 | 6/2001 |
| CN | 106141445 A * | 11/2016 |

(Continued)

OTHER PUBLICATIONS

Riveiro Antonio, Laser cutting using off-axial supersonic rectangular nozzles, Jul. 2017, Precision Engineering (Year: 2017).*

(Continued)

*Primary Examiner* — John J Norton
*Assistant Examiner* — Franklin Jefferson Wang
(74) *Attorney, Agent, or Firm* — HAUPTMAN HAM, LLP (57) ABSTRACT

A machining condition adjustment device adjusts laser beam machining conditions for a laser beam machining device to carry out laser beam machining of a workpiece, produces each of state variables including machining condition data, workpiece data, and plasma generation amount data and determination data including plasma generation amount determination data, and learns adjustment action for the laser beam machining conditions with respect to an amount of plasma generated in the laser beam machining of the workpiece under prescribed laser beam machining conditions, with use of the produced state variables and the produced determination data.

19 Claims, 5 Drawing Sheets

(56) References Cited

U.S. PATENT DOCUMENTS

| | | | | |
|---|---|---|---|---|
| 2013/0068738 A1* | 3/2013 | Schurmann | ............ | B23K 26/03 |
| | | | | 219/121.72 |
| 2013/0178952 A1 | 7/2013 | Wersborg et al. | | |
| 2016/0074964 A1* | 3/2016 | Zollinger | ............. | B23K 26/044 |
| | | | | 219/121.64 |
| 2017/0220927 A1* | 8/2017 | Takigawa | ................ | B23K 26/38 |
| 2018/0147665 A1 | 5/2018 | Furuya | | |
| 2020/0254570 A1* | 8/2020 | Mizoguchi | ......... | B23K 26/1462 |

FOREIGN PATENT DOCUMENTS

| | | | | |
|---|---|---|---|---|
| DE | 19957163 C1 | | 8/2001 | |
| DE | 102016104318 B3 * | | 4/2017 | ........... B23K 26/032 |
| DE | 102017010799 A1 | | 5/2018 | |
| EP | 0668121 A1 * | | 8/1995 | |
| EP | 1618985 A1 * | | 1/2006 | ........... B23K 26/142 |
| GB | 2165789 A * | | 4/1986 | ......... B23K 26/1429 |
| JP | S5451097 A | | 4/1979 | |
| JP | H11-221691 A | | 8/1999 | |
| JP | 200294498 A | | 3/2002 | |
| JP | 2005219093 A | | 8/2005 | |
| JP | 2008304194 A | | 12/2008 | |
| JP | 2009-154189 A | | 7/2009 | |
| JP | 201886711 A | | 6/2018 | |
| TW | 201801840 A * | | 1/2018 | ........... B23K 26/046 |
| WO | 02094498 A1 | | 11/2002 | |

OTHER PUBLICATIONS

CN 106141445 A (Zhe, Zhipeng) Nov. 23, 2016 [retrieved on Dec. 6, 2023]. Retrieved from Espacenet Database, translation by EPO and Google. (Year: 2016) (Year: 2016).*

* cited by examiner

| | AMOUNT OF GENERATED PLASMA | | LASER OUTPUT | MATERIAL TYPE | PLATE THICKNESS | FOCAL POSITION | |
| | PARTICLE DENSITY | TEMPERATURE | | | | | |
| --- | --- | --- | --- | --- | --- | --- | --- |
| 1 | $Pd_1$ | $Pt_1$ | $P_1$ | $Wm_1$ | $Wt_1$ | $Fp_1$ | ⋮ |
| 2 | $Pd_2$ | $Pt_2$ | $P_2$ | $Wm_2$ | $Wt_2$ | $Fp_2$ | ⋮ |
| 3 | $Pd_3$ | $Pt_3$ | $P_3$ | $Wm_3$ | $Wt_3$ | $Fp_3$ | ⋮ |
| ⋯ | ⋮ | ⋮ | ⋮ | ⋮ | ⋮ | ⋮ | ⋮ |

FIG. 6

MACHINING CONDITION ADJUSTMENT DEVICE AND MACHINE LEARNING DEVICE

RELATED APPLICATIONS

The present application claims priority to Japanese Patent Application Number 2018-157520 filed Aug. 24, 2018, the disclosure of which is hereby incorporated by reference herein in its entirety.

BACKGROUND OF THE INVENTION

1. Field of the Invention

The present invention relates to a machining condition adjustment device and a machine learning device.

2. Description of the Related Art

In laser beam cutting machining, material machining is carried out so that molten metal is blown away by laser and flow of assist gas while a constant interval is kept between a workpiece and a nozzle and while a focal position is kept constant. Conventionally, importance has been attached to a pressure exerted on the workpiece during the cutting and it has been thought that a distance between the workpiece and the nozzle should be as short as possible, as typified by Japanese Patent Application Laid-Open No. 2009-154189, for instance.

When high-speed cutting is carried out with the nozzle and the workpiece made close to each other, a rough machined surface is caused by generation of plasma. In addition, expansion of kerf caused by the generation of the plasma frequently results in adhesion of dross (objects like burrs) to the workpiece, so that it may be made difficult to set conditions.

SUMMARY OF THE INVENTION

In view of the above, an object of the present invention is to provide a machining condition adjustment device and a machine learning device that are capable of adjusting laser beam machining conditions so as to reduce the generation of the plasma during laser beam machining of a workpiece.

The machining condition adjustment device of the present invention reduces the generation of the plasma in order to improve cutting quality by using a portion with high flow speed (Mach disk portion) of assist gas ejected from a nozzle and can consequently settle above problems.

Figure 6:
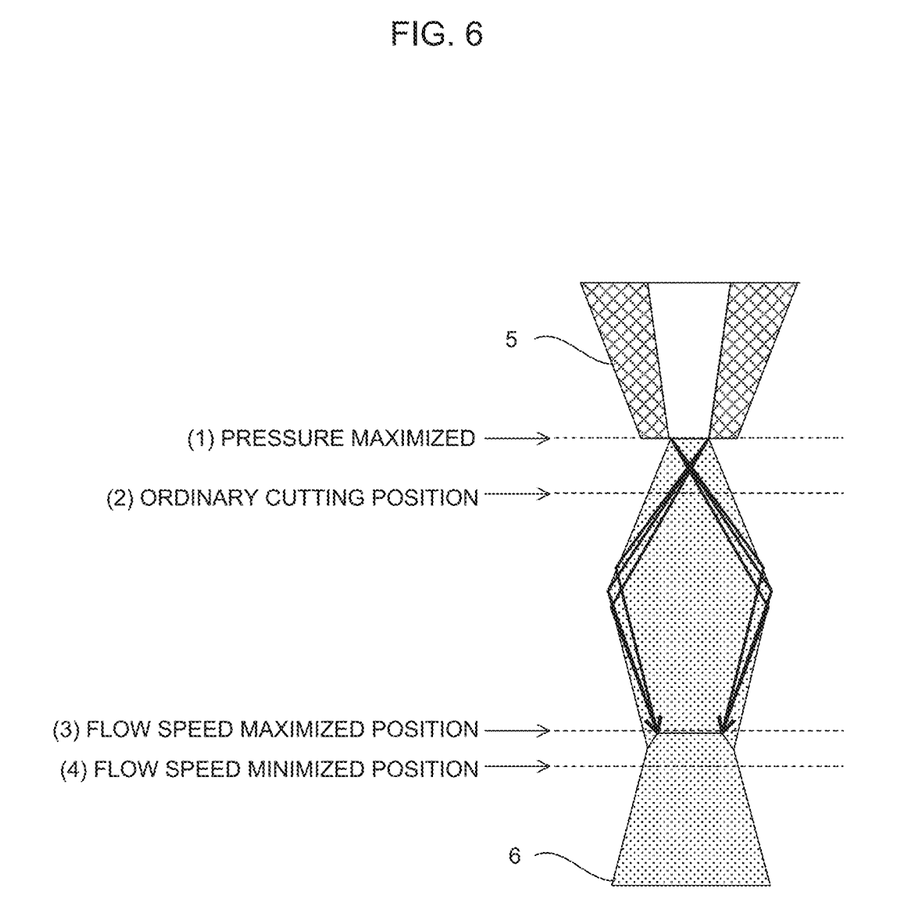
FIG. 6 is a diagram illustrating flow of assist gas ejected from an end of a nozzle in laser beam machining by a laser beam machining device.

FIG. 6 is a diagram illustrating flow of assist gas ejected from an end of a nozzle in laser beam machining by a laser beam machining device.

In FIG. 6, (1) denotes a position of an end part of a nozzle 5 where a gas pressure of assist gas 6 is maximized. It has been thought that a high pressure is preferably exerted on the workpiece in the laser beam machining, as described above, and thus the machining is carried out at position (2) slightly distant from the end part of the nozzle 5 (because the machining at position (1) causes intimate contact between the end of the nozzle 5 and the workpiece and may cause damage to the nozzle 5 from heat, or the like).

On condition that the assist gas 6 is ejected at an ultra-high speed from the end of the nozzle 5, however, a shock wave is generated from a mouth of the nozzle 5 so as to form a wall, which re-converges the assist gas 6 so as to maximize a flow speed of the assist gas 6 at position (3). As a result of iteration of experiments with attention to such a point where the flow speed of the assist gas 6 is maximized, it has been found out that the machining of the workpiece with reduction in the amount of the generated plasma and with satisfactory cutting quality can be attained by the laser beam machining subsequent to positioning of a surface of the workpiece at flow-speed maximizing position (3) for the assist gas 6 or a position that is slightly closer to the nozzle 5 than position (3).

The above position of the workpiece (a gap between the nozzle 5 and the workpiece) that enables the machining with the reduction in the amount of the generated plasma and with the satisfactory cutting quality however, changes according to material and plate thickness of the workpiece, a state of the machining, and the like. The machining condition adjustment device of the present invention makes adjustment of an optimal laser beam machining condition (gap amount) in accordance with the current machining state with use of machine learning.

One aspect of a machining condition adjustment device according to the present invention is a machining condition adjustment device that adjusts a laser beam machining condition for a laser beam machining device to carry out laser beam machining of a workpiece. The machining condition adjustment device includes: a preprocessing unit that produces state variables including laser beam machining condition data indicating the laser beam machining condition in the laser beam machining, workpiece data indicating information related to the workpiece, and plasma generation amount data indicating an amount of plasma generated in the laser beam machining; a state determination unit that produces determination data including plasma generation amount determination data for determination of the amount of the plasma generated in the laser beam machining by the laser beam machining device; and a learning unit that learns adjustment action for the laser beam machining condition with respect to the amount of the plasma generated in the laser beam machining of the workpiece under a prescribed laser beam machining condition, with use of the state variables and the determination data. The plasma generation amount determination data is intended for determination of the amount of the plasma generated in the laser beam machining of the workpiece under the laser beam machining condition adjusted by the adjustment action for the laser beam machining condition.

The learning unit may conduct reinforcement learning in which a high reward is conferred in case where the amount of the plasma generated in the laser beam machining of the workpiece under the prescribed laser beam machining condition is near to a preset amount of the plasma that is to be generated when optimal machining under the prescribed laser beam machining condition is carried out.

Another aspect of a machining condition adjustment device according to the present invention is a machining condition adjustment device that adjusts a laser beam machining condition for a laser beam machining device to carry out laser beam machining of a workpiece. The machining condition adjustment device includes: a preprocessing unit that produces state variables including laser beam machining condition data indicating the laser beam machining condition in the laser beam machining, workpiece data indicating information related to the workpiece, and plasma generation amount data indicating an amount of plasma generated in the laser beam machining; a learning model storage unit that stores a learned model that has learned adjustment action for the laser beam machining condition with respect to the amount of the plasma generated in the laser beam machining of the workpiece under a prescribed laser beam machining condition; and a decision making unit that estimates the adjustment action for the laser beam machining condition with use of the learned model based on the state variables.

The adjustment action for the laser beam machining condition may be adjustment action for a gap between a nozzle of the laser beam machining device and the workpiece.

The adjustment action for the laser beam machining condition may be adjustment action for pressure of assist gas for the laser beam machining device.

The adjustment action for the laser beam machining condition may be adjustment action for change in a nozzle diameter of the laser beam machining device.

The laser beam machining condition data may include the gap between the nozzle of the laser beam machining device and the workpiece.

One aspect of a machine learning device according to the present invention is a machine learning device that adjusts a laser beam machining condition for a laser beam machining device to carry out laser beam machining of a workpiece. The machine learning device includes a learning unit that learns adjustment action for the laser beam machining condition with respect to an amount of plasma generated in the laser beam machining of the workpiece under a prescribed laser beam machining condition, with use of state variables including laser beam machining condition data indicating the laser beam machining condition in the laser beam machining, workpiece data indicating information related to the workpiece, and plasma generation amount data indicating the amount of the plasma generated in the laser beam machining and determination data including plasma generation amount determination data for determination of the amount of the plasma generated in the laser beam machining by the laser beam machining device. The plasma generation amount determination data is intended for determination of the amount of the plasma generated in the laser beam machining of the workpiece under the laser beam machining condition adjusted by the adjustment action for the laser beam machining condition.

Another aspect of a machine learning device according to the present invention is a machine learning device that adjusts a laser beam machining condition for a laser beam machining device to carry out laser beam machining of a workpiece. The machine learning device includes: a learning model storage unit that stores a learned model that has learned adjustment action for the laser beam machining condition with respect to an amount of plasma generated in the laser beam machining of the workpiece under a prescribed laser beam machining condition; and a decision making unit that estimates the adjustment action for the laser beam machining condition with use of the learned model based on state variables including laser beam machining condition data indicating the laser beam machining condition in the laser beam machining, workpiece data indicating information related to the workpiece, and plasma generation amount data indicating the amount of the plasma generated in the laser beam machining.

According to the present invention, the adjustment of the laser beam machining condition during the laser beam machining of the workpiece in the laser beam machining device can be appropriately carried out.

DETAILED DESCRIPTION OF THE PREFERRED EMBODIMENT

Figure 1:
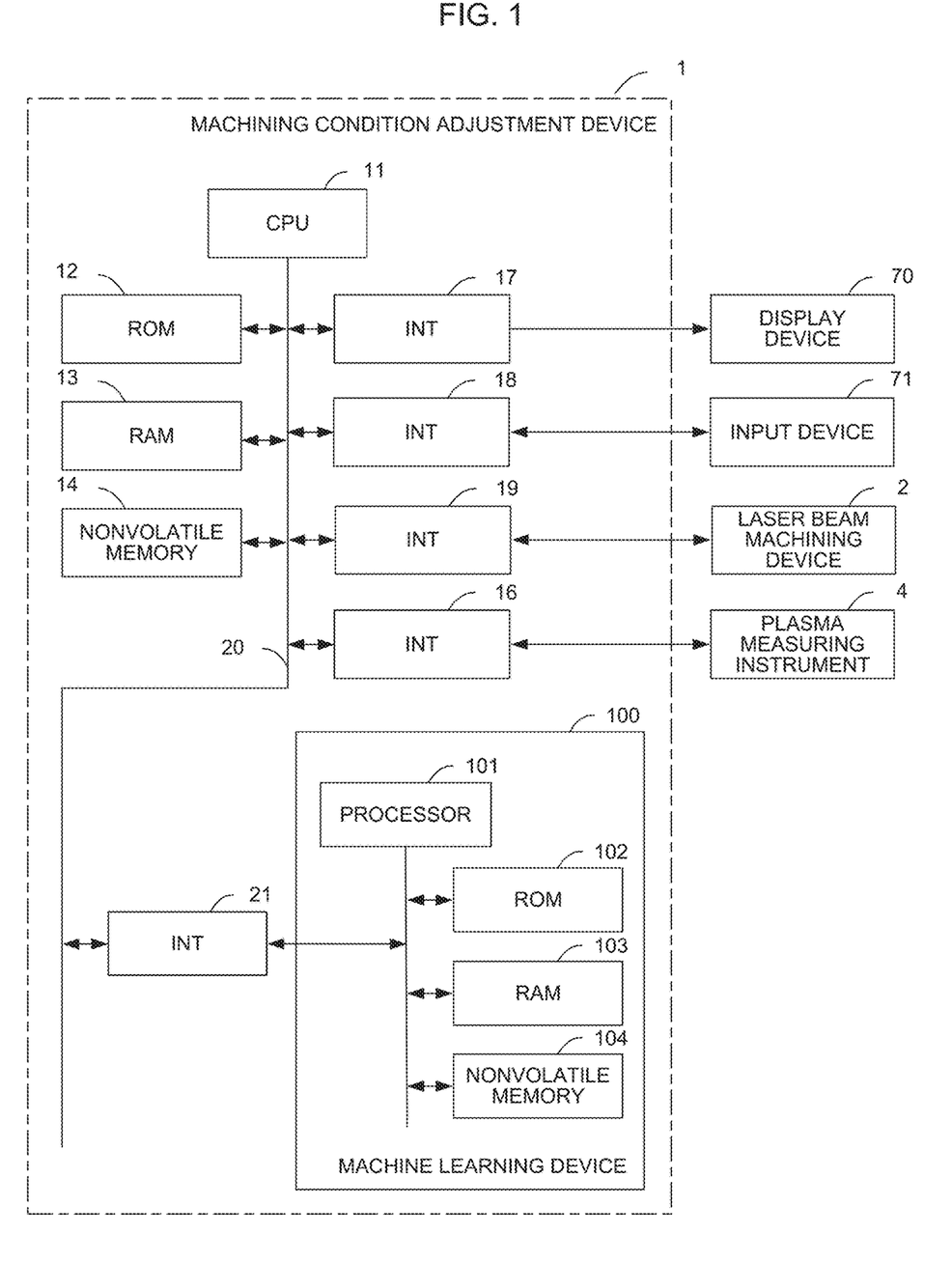
FIG. 1 is a schematic hardware configuration diagram illustrating a machining condition adjustment device according to an embodiment.

FIG. 1 is a schematic hardware configuration diagram illustrating major parts of a machining condition adjustment device including a machine learning device according to an embodiment.

A machining condition adjustment device 1 may be implemented as a controller that controls a laser beam machining device, a personal computer incorporated with a controller that controls a laser beam machining device, or a computer, such as a cell computer, a host computer, an edge server, or a cloud server, connected through a wired/wireless network to the controller, for instance. As the embodiment, an example is presented in which the machining condition adjustment device 1 is implemented as a controller that controls a laser beam machining device 2.

A CPU 11 included by the machining condition adjustment device 1 is a processor that generally controls the machining condition adjustment device 1, reads out system programs stored in a ROM 12 through a bus 20, and controls the whole machining condition adjustment device 1 in accordance with the system programs. Temporary calculation data, various types of data inputted by an operator through an input device 71, and the like are temporarily stored in a RAM 13.

A nonvolatile memory 14 is configured as a memory, an SSD, or the like that is backed up by a battery (not illustrated), for instance, and storage status thereof is retained even when the machining condition adjustment device 1 is powered off. The nonvolatile memory 14 stores: a setting area where setting information on operation of the machining condition adjustment device 1 is stored; control programs, data, and the like for the laser beam machining device 2 that are inputted from the input device 71; various types of data acquired from respective units of the machining condition adjustment device 1 or the laser beam machining device 2 (such as laser output, frequency duty; machining speed, type or pressure of assist gas, material type or plate thickness of a workpiece, nozzle diameter, gap, or focal position in the laser beam machining by the laser beam. machining device 2, or amount of generated plasma that is detected by a plasma measuring instrument 4 installed in the laser beam machining device 2, for instance); and control programs, data, and the like for the laser beam machining device 2 that are read in through an external storage device (not illustrated) or a network. The programs, the various types of data, and the like that are stored in the nonvolatile memory 14 may be expanded in the RAM 13 when executed/used.

System programs, including a publicly known analysis program for analysis of various types of data, a program for control over interaction with a machine learning device 100 to be described later, and the like, have been written in advance into the ROM 12.

The plasma measuring instrument 4 is a measuring instrument that measures the amount of the plasma generated in a vicinity of a site where the laser beam machining is carried out, such as a probe measuring instrument, an electromagnetic instrument, a particle measuring instrument, or a spectroscopic measuring instrument. The plasma measuring instrument 4 may be installed in a vicinity of a laser head included by the laser beam machining device 2 or may be mounted on a hand of a robot (not illustrated) installed in a vicinity of the laser beam machining device 2 in order to measure the amount of the plasma generated in the vicinity of a machining site for the laser beam machining device 2. The CPU 11 is informed of the amount of the generated plasma in the vicinity of the machining site that is measured by the plasma measuring instrument 4, through an interface 16.

Data read onto the memory data obtained as a result of execution of a program or the like, range image data of an object that is obtained from imaging by the plasma measuring instrument 4, data outputted from a machine learning device 100 to be described later, or the like, is outputted through an interface 17 to the display device 70 and displayed thereon. The input device 71 made of a keyboard, a pointing device, or the like receives an instruction, data, or the like based on operation by the operator and passes the instruction, data, or the like through an interface 18 to the CPU 11.

An interface 21 is an interface for connection between the machining condition adjustment device 1 and the machine learning device 100. The machine learning device 100 includes a processor 101 which controls the whole machine learning device 100, a ROM 102 in which system programs and the like are stored, a RAM 103 for temporary storage in processing related to the machine learning, and a nonvolatile memory 104 that is used for storage of a learning model or the like.

The machine learning device 100 is capable of observing various types of information that may be acquired from the machining condition adjustment device 1 through the interface 21 (such as the laser output, the frequency, the duty the machining speed, the type or pressure of the assist gas, the material type or plate thickness of a workpiece, the nozzle diameter, the gap, or the focal position in the laser beam machining by the laser beam machining device 2 or the amount of the generated plasma that is detected by the plasma measuring instrument 4 installed in the laser beam machining device 2). The machining condition adjustment device 1 acquires a processing result, outputted from the machine learning device 100, through the interface 21 and controls the operation of the laser beam machining device 2 based on the acquired result.

Figure 2:
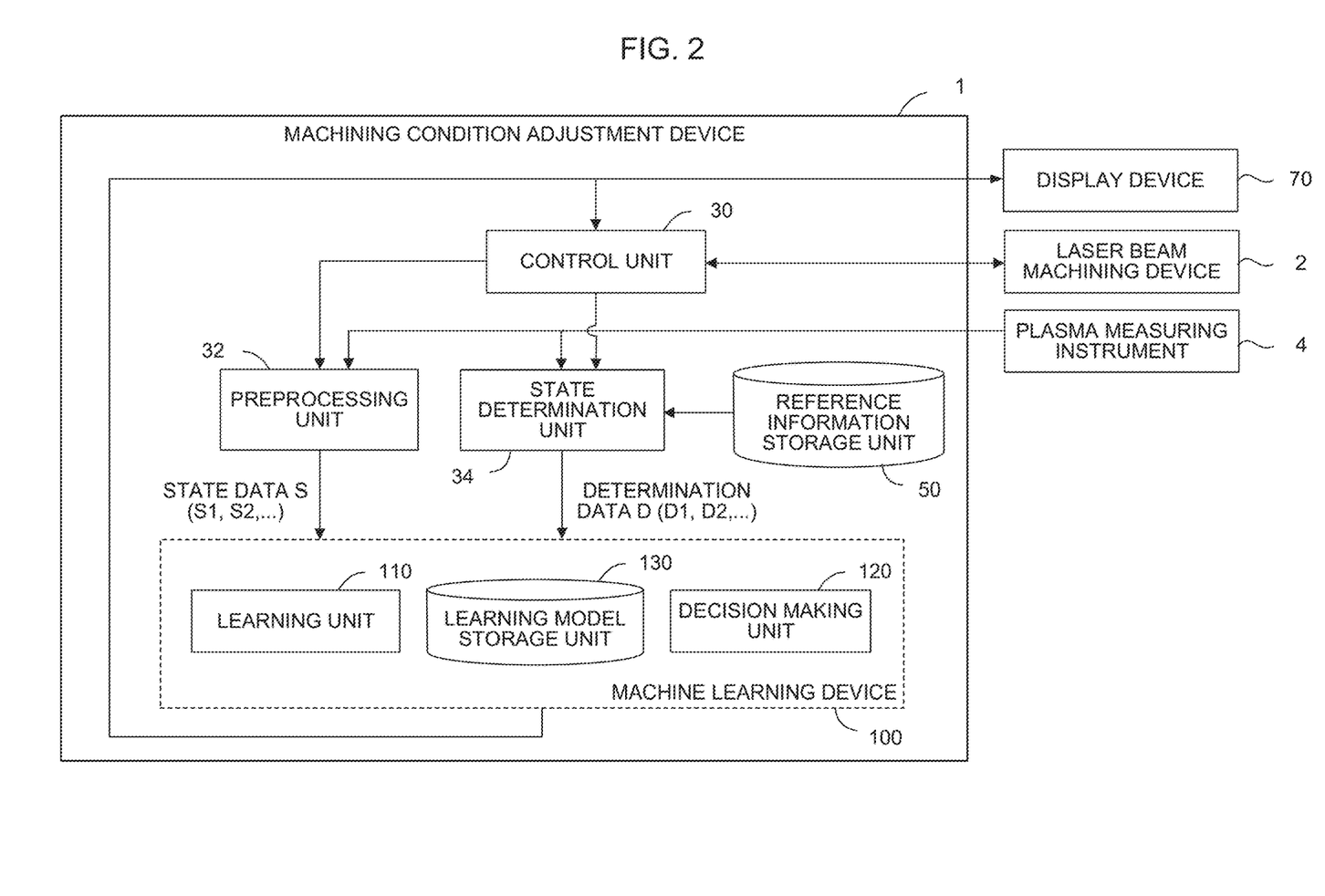
FIG. 2 is a schematic functional block diagram illustrating the machining condition adjustment device according to an embodiment.

FIG. 2 is a schematic functional block diagram illustrating the machining condition adjustment device 1 and the machine learning device 100 according to the embodiment.

Functional blocks illustrated in FIG. 2 are implemented through execution of the respective system programs and control over operation of units of the machining condition adjustment device 1 and the machine learning device 100 by the CPU 11 included by the machining condition adjustment device 1 illustrated in FIG. 1 and the processor 101 of the machine learning device 100.

The machining condition adjustment device 1 of the embodiment includes a control unit 30, a preprocessing unit 32, and a state determination unit 34, and the machine learning device 100 included by the machining condition adjustment device 1 includes a learning unit 110 and a decision making unit 120. In a reference information storage unit 50 provided on the nonvolatile memory 14, data to be criteria of a result of control over the laser beam machining device 2 has been stored in advance through an external storage device not illustrated or a wired/wireless network.

The control unit 30 controls operation of the laser beam machining device 2 in accordance with an instruction from a control program or the like, in general, and, when a change instruction for machining conditions is then outputted from the machine learning device 100, controls the laser beam machining device 2 so that the machining conditions set in advance in the control program or the laser beam machining device 2 may be replaced by the machining conditions outputted from the machine learning device 100. During the control over the laser beam machining device 2, the control unit 30 sequentially acquires instruction values for the laser beam machining device 2 from the control program or the like, or data. that may be acquired from the laser beam machining device 2, such as the laser output, the frequency, the duty, the machining speed, or the like, and outputs the instruction values or the data to the preprocessing unit 32 and the state determination unit 34.

The preprocessing unit 32 produces state data S for use in learning and decision making by the machine learning device 100, based on information acquired from the control unit 30 and the plasma measuring instrument 4. The preprocessing unit 32 produces the state data S by conversion (such as digitization, normalization, or sampling) of acquired data into a unified format that is handled in the machine learning device 100. The state data S produced by the preprocessing unit 32 includes machining condition data S1 indicating the machining conditions in the laser beam machining, workpiece data S2 related to a workpiece to be an object of the laser beam machining, and plasma generation state data S3 related to a generation state of the plasma.

The machining condition data S1 may be acquired as laser beam machining conditions in the laser beam machining that is carried out by the laser beam machining device 2. The laser beam machining conditions in the laser beam machining include the gap that is a distance from an end of a nozzle to the workpiece. The laser beam machining conditions in the laser beam machining may secondarily include the laser output, the frequency, the duty, the machining speed, the type or pressure of the assist gas, the nozzle diameter, the focal position, or the like. The laser beam machining conditions are set in the control program that controls the operation of the laser beam machining device 2 or the machining condition adjustment device 1 and may be acquired from, for example, laser beam machining parameters stored in the nonvolatile memory 14.

The workpiece data S2 includes a type of the material (such as iron or aluminum) and the plate thickness of the workpiece to be the object of the laser beam machining by the laser beam machining device 2. For the type of the material and the plate thickness of the workpiece, information inputted by an operator through an operation panel of the laser beam machining device 2 or the like into the laser beam machining device 2 before a start of the laser beam machining, information inputted by the operator through the input device 71 into the machining condition adjustment device 1, or information acquired from another computer (not illustrated) of a production planning device or the like through a network may be used.

Figure 3:
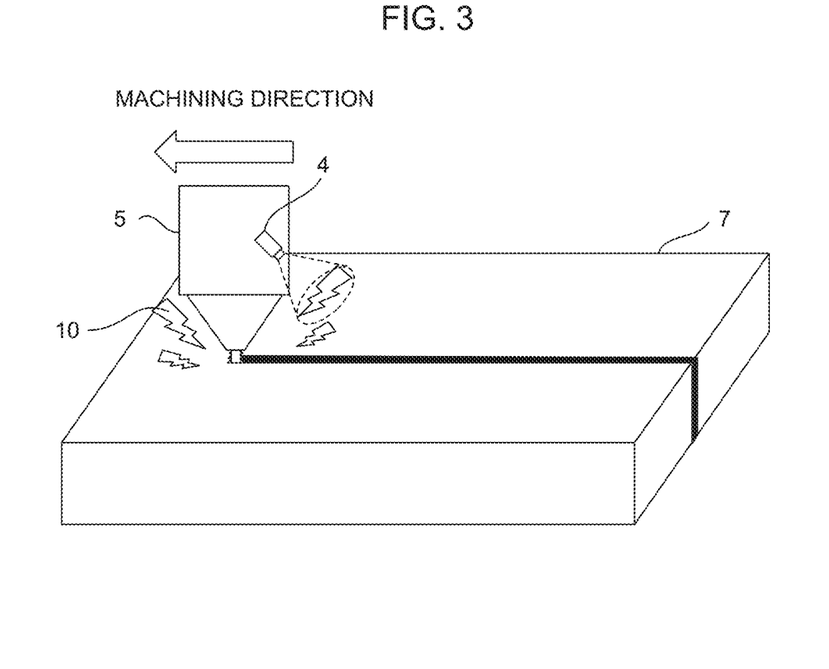
FIG. 3 is a diagram for description of a method of measuring an amount of generated plasma by a plasma measuring instrument in the machining condition adjustment device of FIG. 2.
Figure 4:
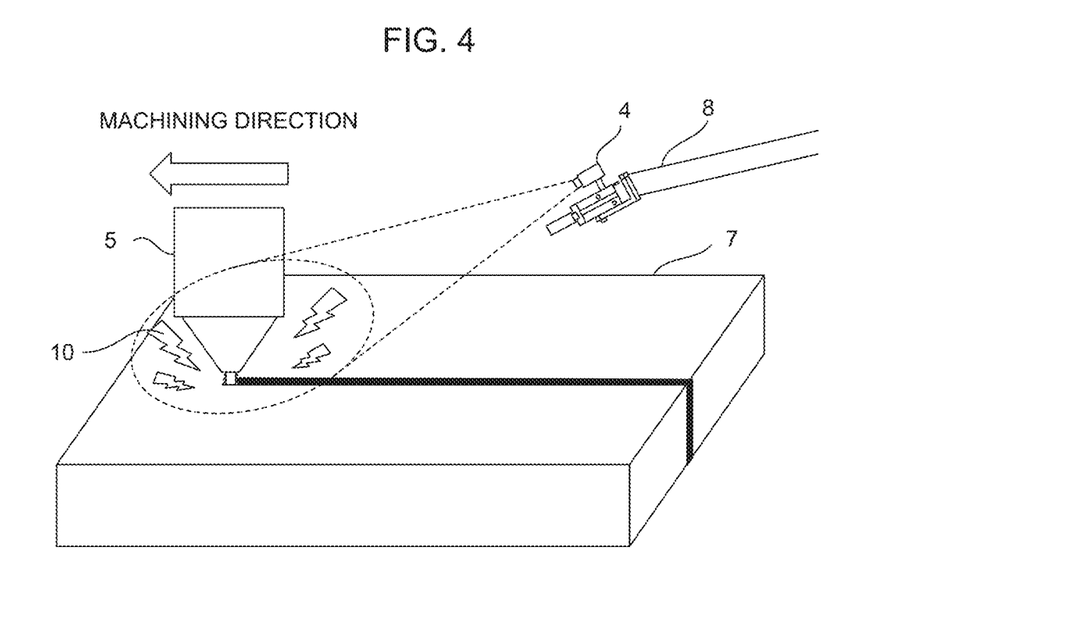
FIG. 4 is a diagram for description of a method of measuring the amount of generated plasma by the plasma measuring instrument in the machining condition adjustment device of FIG. 2.

The plasma generation state data S3 includes the amount of the plasma generated in the vicinity of the position where the laser beam machining is being carried out by the laser beam machining device 2, the amount being measured by the plasma measuring instrument 4. The plasma measuring instrument 4 may measure a density and a temperature of plasma 10 generated in a prescribed area in a vicinity of a machining position on a workpiece 7 to be machined by the laser beam machining device 2, as illustrated in FIG. 3 for instance, or the plasma measuring instrument 4 mounted on a robot hand 8 may measure the density and the temperature of the plasma 10 generated in a prescribed area in the vicinity of a machining position on the workpiece 7 to be machined by the laser beam machining device 2, as illustrated in FIG. 4 as an example. For the plasma generation state data S3, a particle density and the temperature of the plasma 10 may be used as the amount of the generated plasma 10 or the amount of the generated plasma 10 may be measured based on an amount of charge or the like, for instance.

The state determination unit 34 makes a determination of a current generation state of the plasma 10, based on the amount of the plasma 10 generated in the vicinity of the position where the laser beam machining is carried out by the laser beam machining device 2, the amount being measured by the plasma measuring instrument 4, and the criteria stored in advance in the reference information storage unit 50 and produces determination data D as a result of the determination. The determination data D produced by the state determination unit 34 includes plasma generation amount determination data D1 in which a state of the plasma 10 that is to be generated when optimal machining under the current machining conditions is carried out is used as the criteria and which indicates a degree of deviation from the criteria. The plasma generation amount determination data D1 may be a difference between the amount of the plasma that is to be generated when the optimal machining is carried out and the measured amount of the generated plasma or may be a ratio of the measured amount of the generated plasma to the amount of the plasma that is to be generated when the optimal machining is carried out.

The state determination unit 34 is an essential configuration in a stage of learning but is not necessarily the essential configuration after learning of adjustment action for the laser beam machining conditions in the laser beam machining by the learning unit 110 is completed. In case where the machine learning device 100 having completed the learning is shipped to a customer, for instance, the machine learning device 100 from which the state determination unit 34 has been removed may be shipped.

Figure 5:
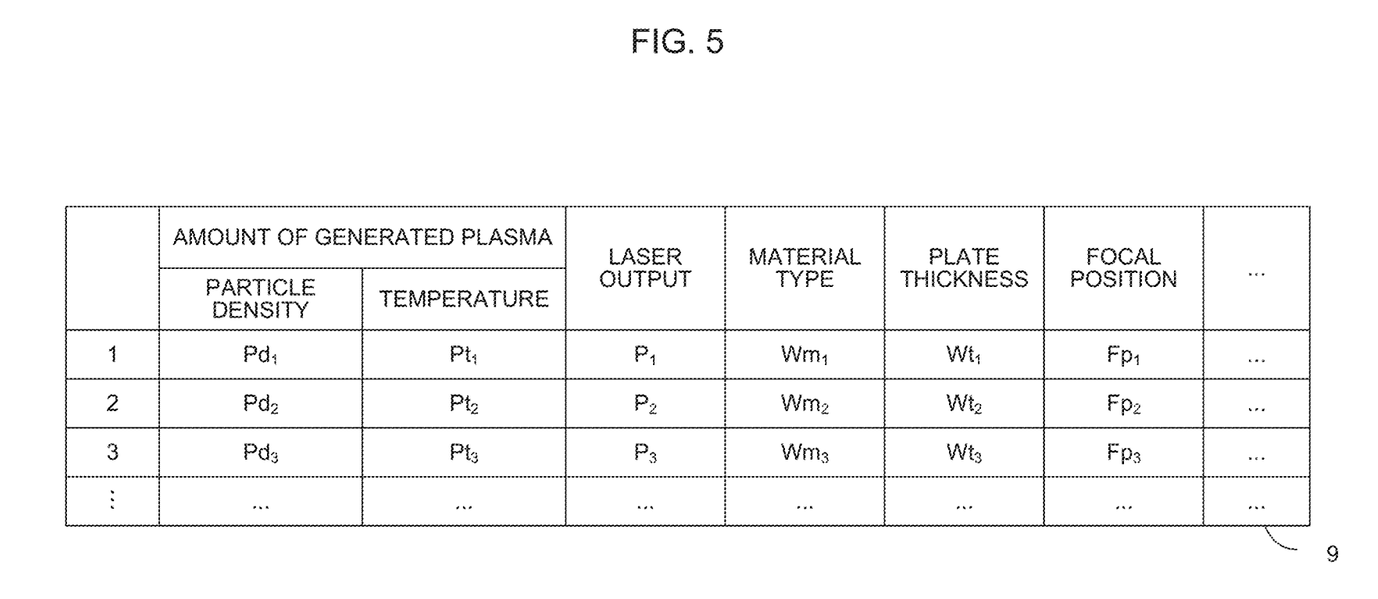
FIG. 5 is a diagram illustrating an example of a criteria table according to an embodiment.

FIG. 5 illustrates an example of a criteria table stored in the reference information storage unit 50.

A criteria table 9 may be defined as a table in which the laser beam machining conditions and the amount of the plasma that is to be generated when the optimal machining under the laser beam machining conditions is carried out are associated with each other. The example of FIG. 5 indicates that, under conditions of the laser output of $P_1$, material type of the workpiece of $Wm_1$, the plate thickness of the workpiece of $Wt_1$, the focal position of $Fp_1$, . . . , execution of the optimal machining is attained by the plasma density $Pd_1$ and the temperature of $Pt_1$, for instance.

A relationship between the machining conditions and the amount of the generated plasma that is defined in the criteria table 9 may be determined in advance by an experiment or the like and may be stored. The machining conditions that are set when the machining is carried out may not coincide with the machining conditions defined in the criteria table 9 because it is impossible to define all the machining conditions that may set in the criteria table 9. In such a case, the amount of the plasma that is to be generated when the optimal machining is carried out may be calculated through linear interpolation or the like based on the plurality of machining conditions defined in the criteria table 9.

The learning unit 110 conducts reinforcement learning with use of the state data S produced by the preprocessing unit 32 and the determination data D produced by the state determination unit 34 and generates (learns) a learned model that has learned appropriateness of the adjustment action for the machining conditions with respect to the generation state of the plasma in the laser beam machining under prescribed machining conditions. The reinforcement learning is a technique in which a cycle including observing a current state (that is, input) of an environment where a learning object exists, executing prescribed action (that is, output) in the current state, and conferring some reward for the action is iterated by a trial-and-error method and in which a measure (the adjustment action for the laser beam machining conditions in the laser beam machining, in the machine learning device of the application) that maximizes total of such rewards is learned as an optimal solution. In the embodiment, the adjustment of the gap is taken as the adjustment action for the laser beam machining conditions in the reinforcement learning.

The learning unit 110 determines a reward R associated with a result (corresponding to the determination data D produced in a learning period subsequent to acquisition of state variables S) of determination of appropriateness of the machining of the workpiece by the laser beam machining device 2 under a prescribed laser beam machining condition (gap), with use of algorithm known as Q-learning, for instance, and updates a function Q (learning model) representing a value of the adjustment action for the laser beam machining conditions in the laser beam machining, with use of the determined reward R. Thus the function Q(s, a) is used as the learning model, the function Q(s, a) representing a value of the action in the case where action a (adjustment action for the laser beam machining conditions, in particular, adjustment action for the gap) is selected in a prescribed state s (defined as the state variables S), and the selection of the action a maximizing the value function Q in the state s makes the optimal solution.

During the learning, the learning unit 110 starts the Q-learning in a state in which correlation between the state s and the action a is unknown, iterates trials and errors in which various types of the action a are selected in the arbitrary state s, and iteratively updates the value function Q so that the value function Q may approximate to the optimal solution. By iterating update of the function Q representing the value, the learning unit 110 learns the adjustment of the laser beam machining conditions in the laser beam machining (adjustment of the gap, for instance) with respect to the amount of the plasma generated in the laser beam machining of the workpiece under the prescribed machining condition.

In the Q-learning by the learning unit 110, for instance, the reward R may be positive (plus) when the result of the determination of the appropriateness of the amount of the plasma generated in the laser beam machining under the prescribed laser beam machining condition is "satisfactory" (that is, in case where the amount of the generated plasma coincides with or approximates to the amount of the plasma that is to be generated when the optimal machining is carried out, for instance) or may be negative (minus) when the result of the determination on the quality is "unsatisfactory" (in case where the amount of the generated plasma is deviated from the amount of the plasma that is to be generated when the optimal machining is carried out, by a prescribed threshold or more or by a prescribed ratio or more, for instance). A value of the reward R may be changed in accordance with a degree of deviation from the amount of the plasma that is to be generated when the optimal machining is carried out. In case where a plurality of pieces of data are included in the determination data D, the plurality of pieces of data may be combined as conditions for the determination.

The learning unit 110 may use a neural network as the value function Q (learning model) and may be configured so as to use the state variable S and the action a as input of the neural network and so as to output a value (result y) of the action a in a state. In such a configuration, the neural network having three layers made of an input layer, an interlayer, and an output layer may be used as the learning model or a so-called deep learning technique with use of the neural network that forms three or more layers may be used so that more effective learning and inferencing may be carried out. The learned model generated by the learning unit 110 is stored in a learning model storage unit 130 provided on the nonvolatile memory 104 and is used for an estimation process for ideal range image data of an object by the decision making unit 120.

The learning unit 110 is an essential configuration during the stage of the learning but is not necessarily essential configuration after the learning of the adjustment action for the laser beam machining conditions in the laser beam machining by the learning unit 110 is completed. In case where the machine learning device 100 that has completed the learning is shipped to a customer, for instance, the machine learning device 100 from which the learning unit 110 has been removed may be shipped.

The decision making unit 120 determines the optimal solution of the adjustment action for the laser beam machining conditions with use of the learned model stored in the learning model storage unit 130 based on the state data S inputted from the preprocessing unit 32 and outputs the determined adjustment action for the laser beam machining conditions. In the decision making unit 120, the state data S inputted from the preprocessing unit 32 (the machining condition data S1, the workpiece data S2, and the plasma generation state data S3) and the adjustment action for the laser beam machining conditions (such as the amount of the adjustment of the gap) are inputted as input data into the learned model generated (having parameters determined) through the reinforcement learning by the learning unit 110, so that the reward to be given when certain action is executed in the current state may be calculated. Calculation of the reward is made for a plurality of manners of the adjustment action for the laser beam machining conditions that may be currently executed and a comparison among a plurality of calculated rewards is made. As a result, the adjustment action for the laser beam machining conditions that results in the calculation of the largest reward is estimated as the optimal solution. The optimal solution, estimated by the decision making unit 120, of the adjustment action for the laser beam machining conditions is inputted into the control unit 30 in order to be used for the adjustment of the laser beam machining conditions and may further be used by being displayed as output on the display device 70 or by being transmitted as output through a wired/wireless network to a host computer or a cloud computer (not illustrated) or the like, for instance.

As the adjustment action for the laser beam machining conditions in the reinforcement learning in a modification of the machining condition adjustment device 1 of the embodiment, adjustment of the pressure of the assist gas may be added to the adjustment of the gap. In this case, as the action a to be selected in the learning by the learning unit 110, only the gap or only the assist gas pressure may be adjusted by a prescribed adjustment amount or both the gap and the assist gas pressure may be adjusted by prescribed adjustment amounts.

As the adjustment action for the laser beam machining conditions in the reinforcement learning in another modification of the machining condition adjustment device 1 of the embodiment, adjustment for change in the nozzle diameter may be added to the adjustment of the gap and the adjustment of the pressure of the assist gas. In this case, those manners of the adjustment action may be selected singularly or appropriately in combination. With use of a publicly known technique disclosed in Japanese Patent Application Laid-Open No. 11-221691 or the like, for instance, the change in the nozzle diameter may be automatically carried out without replacement of the nozzle. The nozzle diameter and the pressure of the assist gas influence a position of a portion with high flow speed (Mach disk portion) of the assist gas ejected from the nozzle and thus, by including such adjustments of nozzle diameter and pressure of the assist gas in the adjustment action, an adjustment of machining conditions can be expected that enables machining of the workpiece with more satisfactory cutting quality.

As the adjustment action for the laser beam machining conditions in the reinforcement learning in another modification of the machining condition adjustment device 1 of the embodiment, the adjustment of the gap may be replaced by the adjustment of the pressure of the assist gas and the adjustment for the change in the nozzle diameter.

As the adjustment action for the laser beam machining conditions in the reinforcement learning in another modification of the machining condition adjustment device 1 of the embodiment, the adjustment of the gap may be replaced by the adjustment of the pressure of the assist gas.

As the adjustment action for the laser beam machining conditions in the reinforcement learning in another modification of the machining condition adjustment device 1 of the embodiment, the adjustment of the gap may be replaced by the adjustment for the change in the nozzle diameter.

Though the embodiment of the present invention has been described above, the present invention is not limited to the examples of the embodiment described above and may be embodied in various manners with appropriate modifications.

For instance, learning algorithm that is executed by the machine learning device 100, arithmetic algorithm that is executed by the machine learning device 100, control algorithm that is executed by the machining condition adjustment device 1, and the like are not limited to the above and various variations of algorithm may be employed.

Though the machining condition adjustment device 1 and the machine learning device 100 are described as devices having different CPUs (processors), in the above embodiment, the machine learning device 100 may be implemented by the CPU 11 included in the machining condition adjustment device 1 and the system programs stored in the ROM 12.

The invention claimed is:
1. A machining condition adjustment device configured to adjust a laser beam machining condition fora laser beam machining device to carry out laser beam machining of a workpiece, the machining condition adjustment device comprising:
a processor configured to
produce state variables including laser beam machining condition data indicating the laser beam machining condition in the laser beam machining, workpiece data indicating information related to the workpiece, and plasma generation amount data indicating an amount of plasma generated in the laser beam machining;
produce determination data including plasma generation amount determination data for determination of the amount of the plasma generated in the laser beam machining by the laser beam machining device; and
learn adjustment action for the laser beam machining condition with respect to the amount of the plasma generated in the laser beam machining of the workpiece under a prescribed laser beam machining condition, with use of the state variables and the determination data, wherein
the plasma generation a mount determination data is for determination of the amount of the plasma generated in the laser beam machining of the workpiece under the laser beam machining condition adjusted by the adjustment action for the laser beam machining condition, and
the prescribed laser beam machining condition includes a condition where the workpiece is machined by the laser beam machining and, during the laser beam machining of the workpiece, a machining surface of the workpiece is at or in a vicinity of a flow speed maximizing position for an assist gas ejected from a nozzle of the laser beam machining device to the workpiece and re-converged due to a shock wave generated from a mouth of the nozzle, wherein
the assist gas is (1) ejected from the nozzle at a gas pressure maximizing position, and (2) then expanded and then re-converged at a position between the gas pressure maximizing position and the flow speed maximizing position in a flow direction of the assist gas.

2. The machining condition adjustment device according to claim 1, wherein
the processor is further configured to conduct reinforcement learning in which a high reward is conferred in case where the amount of the plasma generated in the laser beam machining of the workpiece under the prescribed laser beam machining condition is near to a preset amount of the plasma that is to be generated when optimal machining under the prescribed laser beam machining condition is carried out.

3. The machining condition adjustment device according to claim 1, wherein
the adjustment action for the laser beam machining condition is adjustment action for a gap between the mouth of the nozzle of the laser beam machining device and the workpiece.

4. The machining condition adjustment device according to claim 1, wherein
the adjustment action for the laser beam machining condition is adjustment action for pressure of the assist gas for the laser beam machining device.

5. The machining condition adjustment device according to claim 1, wherein
the adjustment action for the laser beam machining condition is adjustment action for change in a nozzle diameter of the laser beam machining device.

6. The machining condition adjustment device according to claim 1, wherein
the laser beam machining condition data includes at least a gap between the mouth of the nozzle of the laser beam machining device and the workpiece.

7. The machining condition adjustment device according to claim 1, wherein the prescribed laser beam machining condition includes material and plate thickness of the workpiece.

8. A machining condition adjustment device configured to adjust a laser beam machining condition fora laser beam machining device to carry out laser beam machining of a workpiece, the machining condition adjustment device comprising:
a processor configured to produce state variables including laser beam machining condition data indicating the laser beam machining condition in the laser beam machining, workpiece data indicating information related to the workpiece, and plasma generation amount data indicating an amount of plasma generated in the laser beam machining; and
a learning model storage configured to store a learned model that has learned adjustment action for the laser beam machining condition with respect to the amount of the plasma generated in the laser beam machining of the workpiece under a prescribed laser beam machining condition, wherein
the processor is further configured to estimate the adjustment action for the laser beam machining condition with use of the learned model based on the state variables, and
the prescribed laser beam machining condition includes a condition where the workpiece is machined by the laser beam machining and, during the laser beam machining of the workpiece, a machining surface of the workpiece is at or in a vicinity of a flow speed maximizing position for an assist gas ejected from a nozzle of the laser beam machining device to the workpiece and re-converged due to a shock wave generated from a mouth of the nozzle, wherein
the assist gas is (1) ejected from the nozzle at a gas pressure maximizing position, and (2) then expanded and then re-converged at a position between the gas pressure maximizing position and the flow speed maximizing position in a flow direction of the assist gas.

9. The machining condition adjustment device according to claim 8, wherein
the adjustment action for the laser beam machining condition is adjustment action for a gap between the mouth of the nozzle of the laser beam machining device and the workpiece.

10. The machining condition adjustment device according to claim 8, wherein
the adjustment action for the laser beam machining condition is adjustment action for pressure of the assist gas for the laser beam machining device.

11. The machining condition adjustment device according to claim 8, wherein
the adjustment action for the laser beam machining condition is adjustment action for change in a nozzle diameter of the laser beam machining device.

12. The machining condition adjustment device according to claim 8, wherein
the laser beam machining condition data includes at least a gap between the mouth of the nozzle of the laser beam machining device and the workpiece.

13. The machining condition adjustment device according to claim 8, wherein the processor is further configured to cause the estimated adjustment action to be transmitted to a host computer or a cloud computer.

14. The machining condition adjustment device according to claim 8, wherein the prescribed laser beam machining condition includes material and plate thickness of the workpiece.

15. A machine learning device configured to adjust a laser beam machining condition for a laser beam machining device to carry out laser beam machining of a workpiece, the machine learning device comprising:
- a processor configured to learn adjustment action for the laser beam machining condition with respect to an amount of plasma generated in the laser beam machining of the workpiece under a prescribed laser beam machining condition, with use of
  - state variables including laser beam machining condition data indicating the laser beam machining condition in the laser beam machining, workpiece data indicating information related to the workpiece, and plasma generation amount data indicating the amount of the plasma generated in the laser beam machining, and
  - determination data including plasma generation amount determination data for determination of the amount of the plasma generated in the laser beam machining by the laser beam machining device, wherein
- the plasma generation amount determination data is for determination of the amount of the plasma generated in the laser beam machining of the workpiece under the laser beam machining condition adjusted by the adjustment action for the laser beam machining condition, and
- the prescribed laser beam machining condition includes a condition where the workpiece is machined by the laser beam machining and, during the laser beam machining of the workpiece, a machining surface of the workpiece is at or in a vicinity of a flow speed maximizing position for an assist gas ejected from a nozzle of the laser beam machining device to the workpiece and re-converged due to a shock wave generated from a mouth of the nozzle, wherein
- the assist gas is (1) ejected from the nozzle at a gas pressure maximizing position, and (2) then expanded and then re-converged at a position between the gas pressure maximizing position and the flow speed maximizing position in a flow direction of the assist gas.

16. The machine learning device according to claim 15, wherein the prescribed laser beam machining condition includes material and plate thickness of the workpiece.

17. A machine learning device configured to adjust a laser beam machining condition for a laser beam machining device to carry out laser beam machining of a workpiece, the machine learning device comprising:
- a learning model storage configured to store a learned model that has learned adjustment action for the laser beam machining condition with respect to an amount of plasma generated in the laser beam machining of the workpiece under a prescribed laser beam machining condition; and
- a processor configured to estimate the adjustment action for the laser beam machining condition with use of the learned model based on state variables including laser beam machining condition data indicating the laser beam machining condition in the laser beam machining, workpiece data indicating information related to the workpiece, and plasma generation amount data indicating the amount of the plasma generated in the laser beam machining, wherein
- the prescribed laser beam machining condition includes a condition where the workpiece is machined by the laser beam machining and, during the laser beam machining of the workpiece, a machining surface of the workpiece is at or in a vicinity of a flow speed maximizing position for an assist gas ejected from a nozzle of the laser beam machining device to the workpiece and re-converged due to a shock wave generated from a mouth of the nozzle, wherein
- the assist gas is (1) ejected from the nozzle at a gas pressure maximizing position, and (2) then expanded and then re-converged at a position between the gas pressure maximizing position and the flow speed maximizing position in a flow direction of the assist gas.

18. The machine learning device according to claim 17, wherein the processor is further configured to cause the estimated adjustment action to be transmitted to a host computer or a cloud computer.

19. The machine learning device according to claim 17, wherein the prescribed laser beam machining condition includes material and plate thickness of the workpiece.

\* \* \* \* \*